United States Patent
Takenaka

(10) Patent No.: US 12,026,566 B2
(45) Date of Patent: Jul. 2, 2024

(54) IMAGE FORMING APPARATUS CAPABLE OF PRINTING IMAGE APPROPRIATE TO SHEET TO BE FED, METHOD OF CONTROLLING IMAGE FORMING APPARATUS, AND STORAGE MEDIUM

(71) Applicant: CANON KABUSHIKI KAISHA, Tokyo (JP)

(72) Inventor: Shuichi Takenaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/490,035

(22) Filed: Oct. 19, 2023

(65) Prior Publication Data

US 2024/0143965 A1  May 2, 2024

(30) Foreign Application Priority Data

Oct. 28, 2022  (JP) .................... 2022-173238

(51) Int. Cl.
*G06K 15/02* (2006.01)
*G06K 15/00* (2006.01)

(52) U.S. Cl.
CPC ....... *G06K 15/1843* (2013.01); *G06K 15/002* (2013.01)

(58) Field of Classification Search
None
See application file for complete search history.

(56) References Cited

U.S. PATENT DOCUMENTS

2014/0211226 A1*  7/2014  Ishii ................... H04N 1/2323
358/1.12

FOREIGN PATENT DOCUMENTS

| JP | 2001189826 A | | 7/2001 |
| JP | 2005182246 A | * | 7/2005 |
| JP | 2008171073 A | * | 7/2008 |
| JP | 2013037547 A | * | 2/2013 |

OTHER PUBLICATIONS

English translation of JP-2005182246-A. (Year: 2005).*
English translation of JP-2008171073-A. (Year: 2008).*
English translation of JP-2013037547-A. (Year: 2013).*

* cited by examiner

*Primary Examiner* — Thomas D Lee
(74) *Attorney, Agent, or Firm* — ROSSI, KIMMS & McDOWELL LLP

(57) ABSTRACT

An image forming apparatus that includes a sheet feeding unit and forms an image on a sheet fed from the sheet feeding unit. Electronic data item is acquired from a cloud service that manages a plurality of electronic data items. A sheet size is extracted from the electronic data item. An image of the electronic data item is formed on a sheet having the extracted sheet size. In a case where predetermined attribute information indicating a job using the cloud service is included in the electronic data item, the image of the electronic data item, appropriate to a sheet fed from the sheet feeding unit, is formed on the fed sheet.

12 Claims, 13 Drawing Sheets

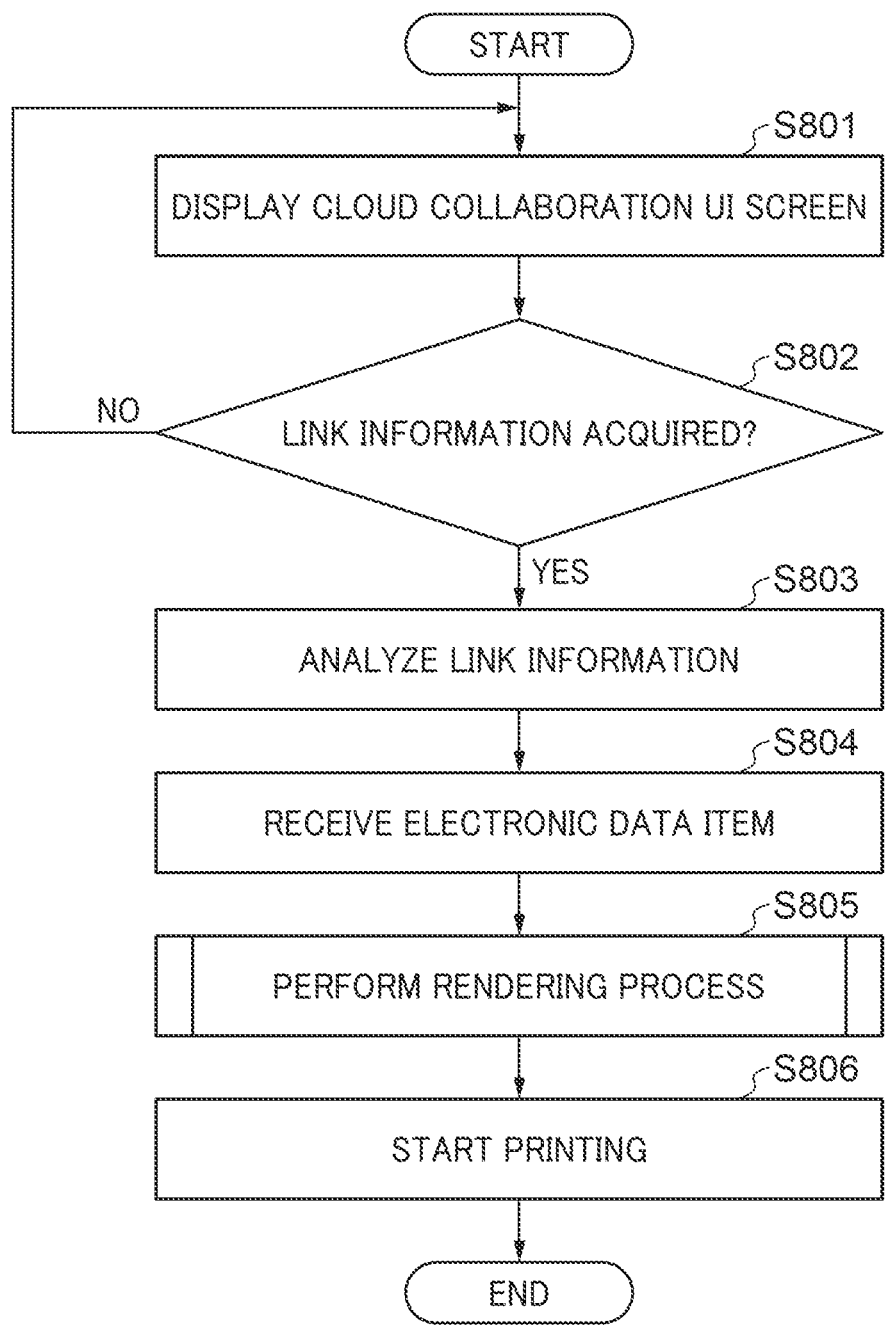

IMAGE FORMING APPARATUS CAPABLE OF PRINTING IMAGE APPROPRIATE TO SHEET TO BE FED, METHOD OF CONTROLLING IMAGE FORMING APPARATUS, AND STORAGE MEDIUM

BACKGROUND OF THE INVENTION

Field of the Invention

The present invention relates to an image forming apparatus that is capable of printing an image appropriate to a sheet to be fed, a method of controlling the image forming apparatus, and a storage medium.

Description of the Related Art

There is known an image forming apparatus equipped with a cloud collaboration function for accessing an electronic data item, such as PDF data, which is managed through a cloud service, for printing the electronic data item. Methods of realizing the cloud collaboration function include a pull type method and a push type method. In the pull type method, the image forming apparatus acquires link information of an electronic data item to be printed, acquires the electronic data item indicated by the acquired link information from a cloud service, and prints the electronic data item. In the push type method, the cloud service designates an image forming apparatus as an output device, transmits an electronic data item to the designated image forming apparatus, and causes the image forming apparatus to execute printing of the electronic data item.

The electronic data item managed by the cloud service includes a variety of items of information used for a variety of services linked for collaboration, which includes, for example, a sheet size of a sheet to be used for printing. The image forming apparatus having acquired such an electronic data item acquires the sheet size from the electronic data item and prints the electronic data item on a sheet of the acquired sheet size. In a case where a sheet matching the sheet size acquired from the electronic data item is not accommodated in a sheet feeding section of the image forming apparatus, it is required to perform processing for making the image of the electronic data item appropriate to the sheet to be fed from the sheet feeding section. As a related art, there has been proposed a technique disclosed in Japanese Laid-Open Patent Publication (Kokai) No. 2001-189826. According to this technique, in a case where an image size of an original read by a reading section of an image forming apparatus does not match a sheet size of a sheet to be fed from a sheet feeding section, expansion processing is performed on the image so as to make the image of the electronic data item appropriate to the sheet to be fed from the sheet feeding section.

However, the technique disclosed in Japanese Laid-Open Patent Publication (Kokai) No. 2001-189826 assumes that the image forming apparatus reads an original by using the reading section thereof, and the above-described technique disclosed in Japanese Laid-Open Patent Publication (Kokai) No. 2001-189826 cannot be applied to the cloud collaboration function for printing an electronic data item acquired from the cloud service. That is, in the conventional technique, in a case where a sheet matching a sheet size included in an electronic data item acquired from the cloud service is not accommodated in the sheet feeding section of the image forming apparatus, an image appropriate to a sheet to be fed from the sheet feeding section cannot be printed.

SUMMARY OF THE INVENTION

The present invention provides an image forming apparatus that is capable of printing, in a case where a sheet matching a sheet size included in an electronic data item acquired from a cloud service is not accommodated in a sheet feeding section of the image forming apparatus, an image made appropriate to a sheet to be fed from the sheet feeding section, on the fed sheet, a method of controlling the image forming apparatus, and a storage medium.

In a first aspect of the present invention, there is provided an image forming apparatus that includes a sheet feeding unit and forms an image on a sheet fed from the sheet feeding unit, including an acquisition unit configured to acquire an electronic data item from a server that manages a plurality of electronic data items, an extraction unit configured to extract a sheet size from the electronic data item, and an image forming unit configured to form an image of the electronic data item on a sheet having the extracted sheet size, wherein in a case where predetermined attribute information indicating that the electronic data item is for a job using the server is included in the electronic data item, the image forming unit forms the image of the electronic data item, which is appropriate to a sheet fed from the sheet feeding unit, on the fed sheet.

In a second aspect of the present invention, there is provided a method of controlling an image forming apparatus that includes a sheet feeding unit and forms an image on a sheet fed from the sheet feeding unit, including acquiring an electronic data item from a server that manages a plurality of electronic data items, extracting a sheet size from the electronic data item, and forming an image of the electronic data item on a sheet having the extracted sheet size, wherein the forming of the image of the electronic data item includes forming the image of the electronic data item, which is appropriate to a sheet fed from the sheet feeding unit, on the fed sheet in a case where predetermined attribute information indicating that the electronic data item is for a job using the server is included in the electronic data item.

According to the present invention, in a case where a sheet matching a sheet size included in an electronic data item acquired from a cloud service is not accommodated in the sheet feeding section of the image forming apparatus, it is possible to print an image made appropriate to a sheet fed from the sheet feeding section, on the fed sheet.

Further features of the present invention will become apparent from the following description of exemplary embodiments (with reference to the attached drawings).

BRIEF DESCRIPTION OF THE DRAWINGS

FIG. 8 is a flowchart of a cloud collaboration control process performed by the image forming apparatus appearing in FIG. 1.

DESCRIPTION OF THE EMBODIMENTS

The present invention will now be described in detail below with reference to the accompanying drawings showing embodiments thereof. Here, before describing the configuration of an image forming apparatus according to a first embodiment, a cloud collaboration function equipped in the image forming apparatus will be described. Methods of realizing the cloud collaboration function include a pull type method and a push type method. In the pull type method, the image forming apparatus acquires link information of an electronic data item to be printed, acquires the electronic data item indicated by the acquired link information from a cloud service, and prints the electronic data item. In the push type method, the cloud service designates an image forming apparatus as an output device, transmits an electronic data item to the designated image forming apparatus, and causes the image forming apparatus to execute printing of the electronic data item. In both of the pull type method and the push type method, it is required to provide link information for accessing the electronic data item to the image forming apparatus so as to enable the image forming apparatus to refer to an electronic data item managed by the cloud service. Therefore, in the first embodiment, a description will be given of a configuration in which Web page information is provided as URL information by using a Web browser function equipped in the image forming apparatus, and the URL information is used as the link information for accessing an electronic data item.

In the first embodiment, a use case is assumed where a cloud service is accessed by using the Web browser function equipped in the image forming apparatus. In this use case, a user confirms information on electronic data items managed by the cloud service from a console section of the image forming apparatus. Further, the image forming apparatus acquires an electronic data item indicated by URL information selected by the user from the cloud service and prints the acquired electronic data item. Note that although in the present embodiment, PDF is assumed as the data format of an electronic data item, the data format of an electronic data item is not limited to PDF. For example, the data format of an electronic data item can be any other data format insofar as it is a data format that can hold size information, such as Word, Power Point, and Excel which are provided by Microsoft Office.

Figure 1:
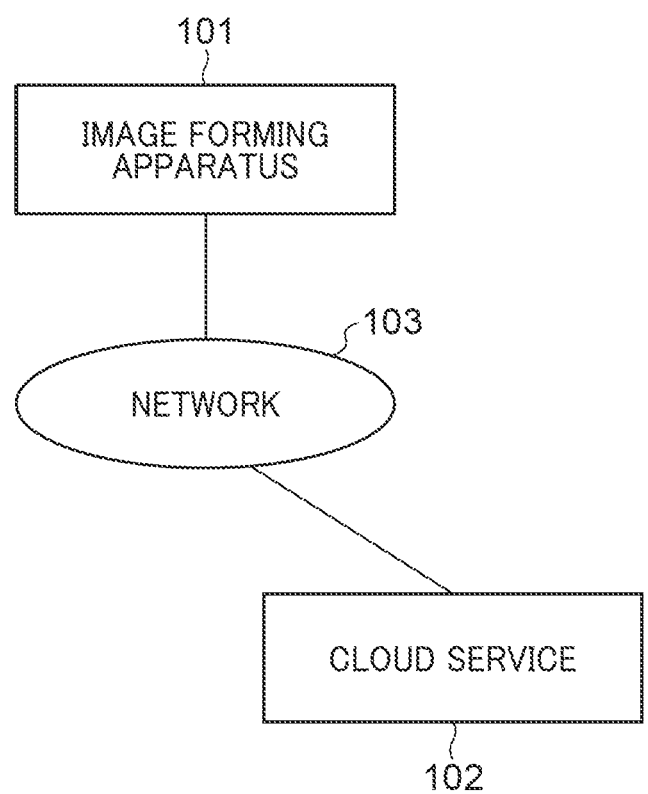
FIG. 1 is a block diagram showing the configuration of a printing system including an image forming apparatus according to a first embodiment of the present invention.

FIG. 1 is a block diagram showing the configuration of a printing system including an image forming apparatus 101 according to the present embodiment. Referring to FIG. 1, this printing system is formed by the image forming apparatus 101 and a cloud service 102. The image forming apparatus 101 and the cloud service 102 are connected by a network 103.

The image forming apparatus 101 is, for example, a multifunction peripheral equipped with a variety of functions, such as a scan function, a FAX function, a print function, and a copy function. Note that the image forming apparatus 101 can be a printer equipped only with the print function.

The cloud service 102 is a service constructed on the cloud and is realized by a plurality of cloud servers cooperating with each other. An electronic data item of a data format, such as PDF or Word/Power Point/Excel provided by Microsoft Office, is stored in a storage area of each cloud server.

Figure 2:
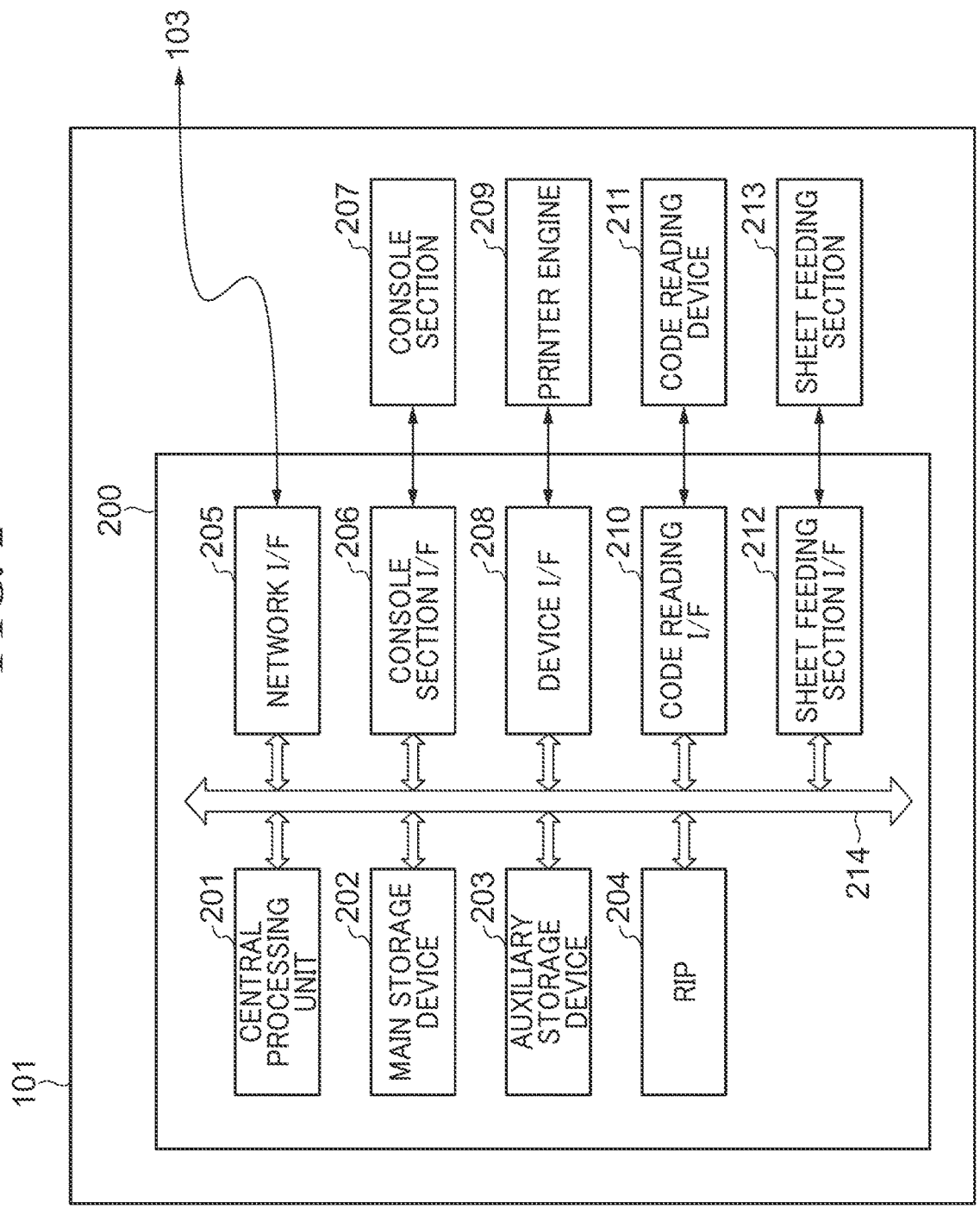
FIG. 2 is a schematic block diagram showing the configuration of the image forming apparatus appearing in FIG. 1.

FIG. 2 is a schematic block diagram showing the configuration of the image forming apparatus 101 appearing in FIG. 1. Referring to FIG. 2, the image forming apparatus 101 includes a controller unit 200, a console section 207, a printer engine 209, a code reading device 211, and a sheet feeding section 213. The controller unit 200 is connected to the console section 207, the printer engine 209, the code reading device 211, and the sheet feeding section 213. Further, the controller unit 200 includes a central processing unit 201, a main storage device 202, an auxiliary storage device 203, a raster image processor (RIP) 204, a network interface 205, a console section interface 206, a device interface 208, a code reading interface 210, and a sheet feeding section interface 212. These components are interconnected via a system bus 214.

The controller unit 200 controls inputting and outputting of an image signal and device information. The central processing unit 201 loads programs stored in the auxiliary storage device 203 into the main storage device 202 and executes the loaded programs to thereby perform centralized control of the devices connected to the system bus 214.

The main storage device 202 functions as a main memory and a work memory for the central processing unit 201. The auxiliary storage device 203 holds a large volume of data temporarily or for a long term. The RIP 204 is a software module or a dedicated hardware component for developing intermediate print data into raster image data. The RIP 204 realizes high-speed processing by processing intermediate print data generated by the central processing unit 201 and stored in the main storage device 202, in parallel with execution of processing by the central processing unit 201. The network interface 205 is connected to the network 103 and controls inputting and outputting of print data and device information from and to an external apparatus. The network interface 205 can be connected to the network 103 by a wired cable or can be connected to the network 103 by wireless communication, such as Wi-Fi. Further, the network interface 205 directly inputs and outputs information from and to a short-range wireless communication terminal by using short-range wireless communication, such as near field communication (NFC) or Bluetooth (registered trademark).

The console section interface 206 is an interface with the console section 207. The console section interface 206 outputs image data to be displayed on the console section 207, to the console section 207. Further, the console section interface 206 acquires information input to the console section 207 by a user and outputs the acquired information to the central processing unit 201. The console section 207 includes a liquid crystal panel and a sound source as output devices, and includes a touch panel, hard keys, and a microphone as input devices. The device interface 208 delivers image signals, outputs an operation instruction to the device, and receives device information, based on associated instructions by the central processing unit 201. The printer engine 209 is connected to the device interface 208. The printer engine 209 is an output device that performs an image forming process based on image signals received from the controller unit 200. The image forming process forms an image on a recording medium, such as a sheet. Note that for the image forming process performed by the printer engine 209, an electrophotographic method or an inkjet method is employed.

The code reading interface 210 outputs link information read by the code reading device 211 to the central processing unit 201. The code reading device 211 is a reading device, such as a code reader, that reads code information, such as a QR code (registered trademark) and a barcode, and link information from an IC card. The sheet feeding section interface 212 controls sheet feeding from the sheet feeding section 213 according to an instruction received from the central processing unit 201. The sheet feeding section 213 is formed by a plurality of sheet feeding cassettes. In each sheet feeding cassette, recording media, such as sheets, used for printing are accommodated. The sheet feeding section 213 feeds a sheet from one sheet feeding cassette designated from the plurality of sheet feeding cassettes, to the printer engine 209.

Figure 3:
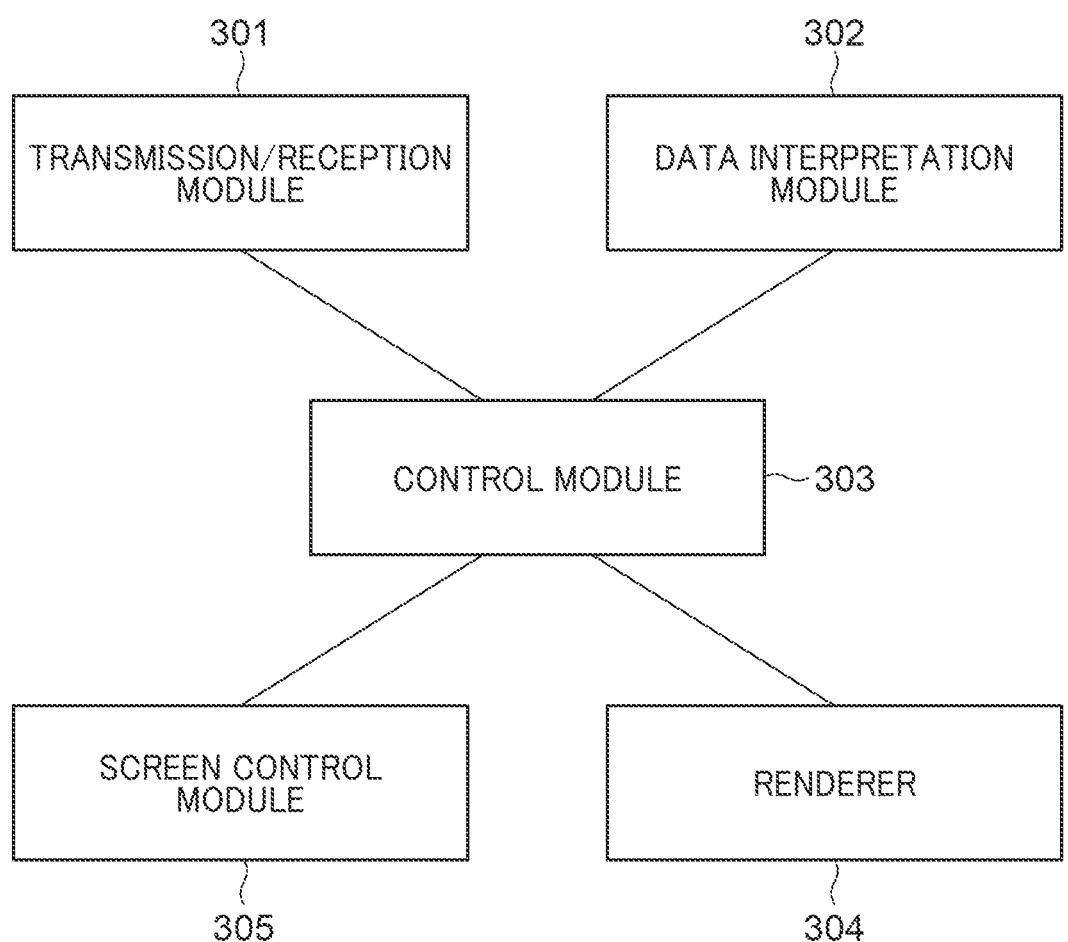
FIG. 3 is a block diagram of software modules of the image forming apparatus appearing in FIG. 1.

FIG. 3 is a block diagram of software modules of the image forming apparatus 101 appearing in FIG. 1. As shown in FIG. 3, the image forming apparatus 101 includes a transmission/reception module 301, a data interpretation module 302, a control module 303, a renderer 304, and a screen control module 305, as the software modules. These modules are stored in the auxiliary storage device 203 as the programs. Processing operations performed by these modules are realized by the central processing unit 201 that loads these programs into the main storage device 202 and executes the loaded programs.

The transmission/reception module 301 controls the network interface 205 to perform processing for communication with an external apparatus. For example, the transmission/reception module 301 performs processing for receiving an electronic data item indicated by link information from the cloud service 102. The data interpretation module 302 reads an electronic data item received from the cloud service 102 by the control of the transmission/reception module 301 and performs processing for interpreting the electronic data item. With this, drawing information forming the electronic data item is extracted. The extracted drawing information is sent to the renderer 304 via the control module 303.

The control module 303 performs centralized control of processing operations for display control of a user interface screen, management of link information designated by a user, reception of an electronic data item, interpretation of data, rendering of an image, and so forth. The renderer 304 controls the RIP 204 to generate a bitmap image based on the drawing information received from the data interpretation module 302. The generated bitmap image is sent to the printer engine 209 via the device interface 208. The printer engine 209 performs the image forming process using this bitmap image. The screen control module 305 generates a variety of user interface screens and manages interaction with a user.

Figure 4:
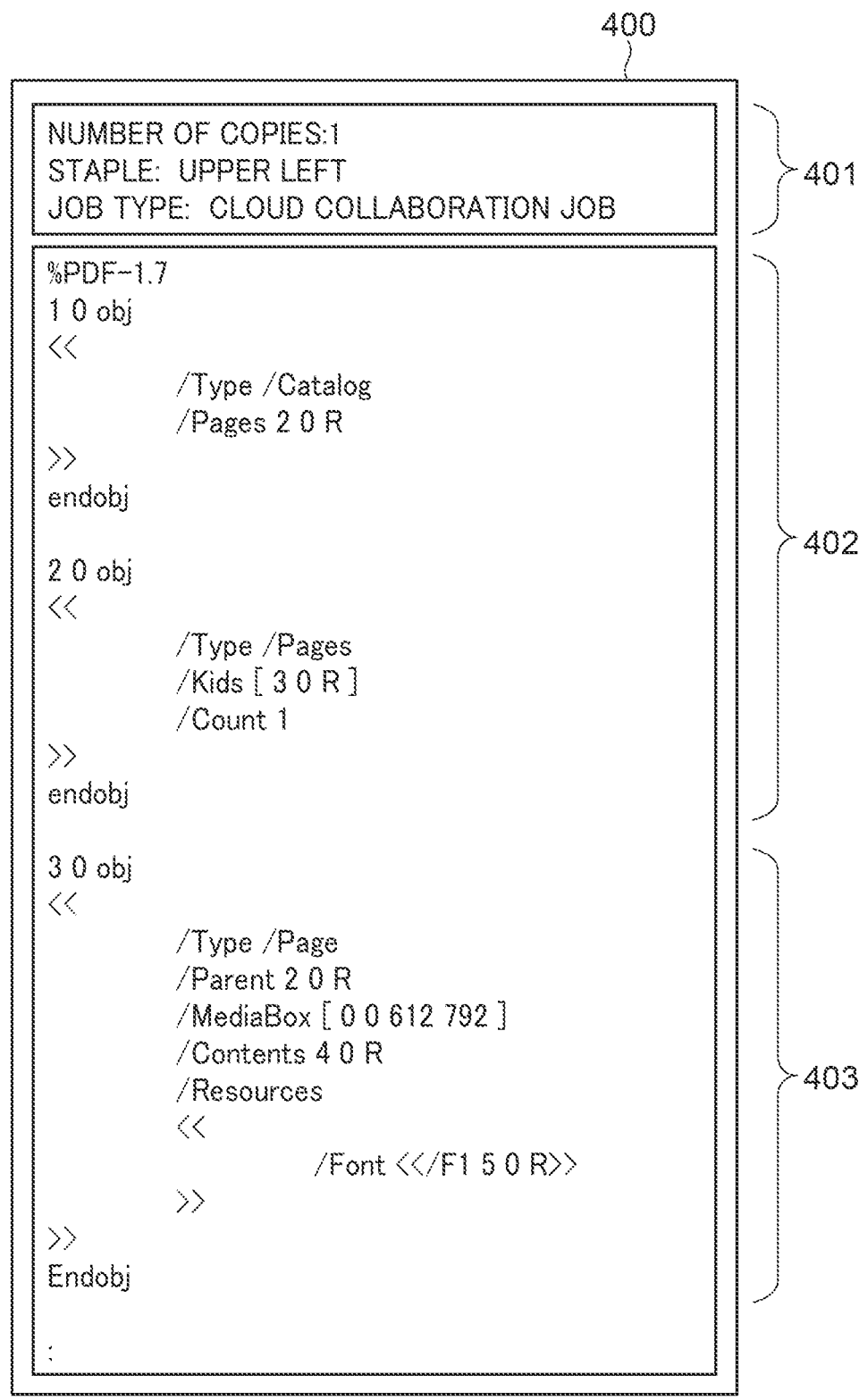
FIG. 4 is a diagram showing an example of the format of an electronic data item managed by a cloud service appearing in FIG. 1.

Next, the configuration of the electronic data item managed by the cloud service 102 will be described. FIG. 4 is a diagram showing an example of the format of an electronic data item 400 managed by the cloud service 102 appearing in FIG. 1. Although FIG. 4 shows the format of PDF data which is an example of the electronic data item, the data format of the electronic data item is not limited to that of PDF. The data format of the electronic data item can be any other data format insofar as it is a data format that can hold the size information, such as Word/Power Point/Excel provided by Microsoft Office, as mentioned above.

The electronic data item 400 is mainly formed by three regions: a header portion 401, a data structure-describing portion 402, and a drawing content-describing portion 403. In the present embodiment, the configurations of the data structure-describing portion 402 and the drawing content-describing portion 403 will be described using a simplified example of language description as the PDF data.

The header portion 401 is an area for specifying attribute information which is necessary for print control and can be uniquely specified by each printer vendor, and is referred to as given information for the print control. In the header portion 401, information can be described in a description format different from a language description format of the electronic data item. For example, in the header portion 401, as shown in FIG. 4, number-of-copies attribute information for specifying the number of to-be-printed copies of an electronic data item, staple attribute information for specifying a position of a stapler, job attribute information for specifying a type of a job, and so forth, are described. Further, besides these, other attribute information associated with finishing and layout control, such as a punching position, a folding direction, and Nup printing, can also be described. Note that the attribute information can be described in the header portion 401 by the cloud service 102 when an electronic data item is transmitted to the image forming apparatus 101. Alternatively, the attribute information can be described in the header portion 401 by the image forming apparatus 101 based on print settings information set for the image forming apparatus 101 when the image forming apparatus 101 receives an electronic data item from the cloud service 102. However, in the configuration in which the image forming apparatus 101 describes the attribute information in the header portion 401, in a case where the transmission source of an electronic data item is the cloud service 102, the image forming apparatus 101 describes job attribute information indicating a cloud collaboration job in the header portion 401. Note that the cloud collaboration job is a print job using the cloud service 102, more specifically, a print job for printing an electronic data item acquired from the cloud service 102.

The data structure-describing portion 402 is an area for defining the data structure of an electronic data item. For example, in FIG. 4, in the data structure-describing portion 402, "/Type/Catalog/Pages 2 0 R" is written as an object [1 0]. This description sets that the number of pages is indicated at the position of the following object [2 0]. Further, in FIG. 4, in the data structure-describing portion 402, "/Type/Pages/Kids [3 0 R]/Count 1" is written as the object [2 0]. This description sets that the drawing contents in the following object [3 0] are treated as the first page. Thus, the objects [1 0] and [2 0] indicates that the electronic data item is data of one page.

The drawing content-describing portion 403 is an area for defining the drawing contents of an electronic data item. For example, in FIG. 4, in the drawing content-describing portion 403, definition of the drawing contents is described as the object [3 0]. Further, a sheet size is described in the drawing content-describing portion 403. For example, in the drawing content-describing portion 403, "/MediaBox [0 0 612 792]" is written. With this description, the sheet size of LTR, which has a lateral width of 612 inches and a longitudinal length of 792 inches, is set as the sheet size of a sheet used to print the electronic data item 400. In the image forming process, the data interpretation module 302 interprets the sheet size described in this "/MediaBox" and performs layout control of the drawing object included in the electronic data item. Further, in the image forming process, a sheet feeding cassette accommodating sheets having the above-mentioned sheet size is selected, and control for feeding a sheet from the sheet feeding cassette to the printer engine 209 is performed.

Figure 5A:
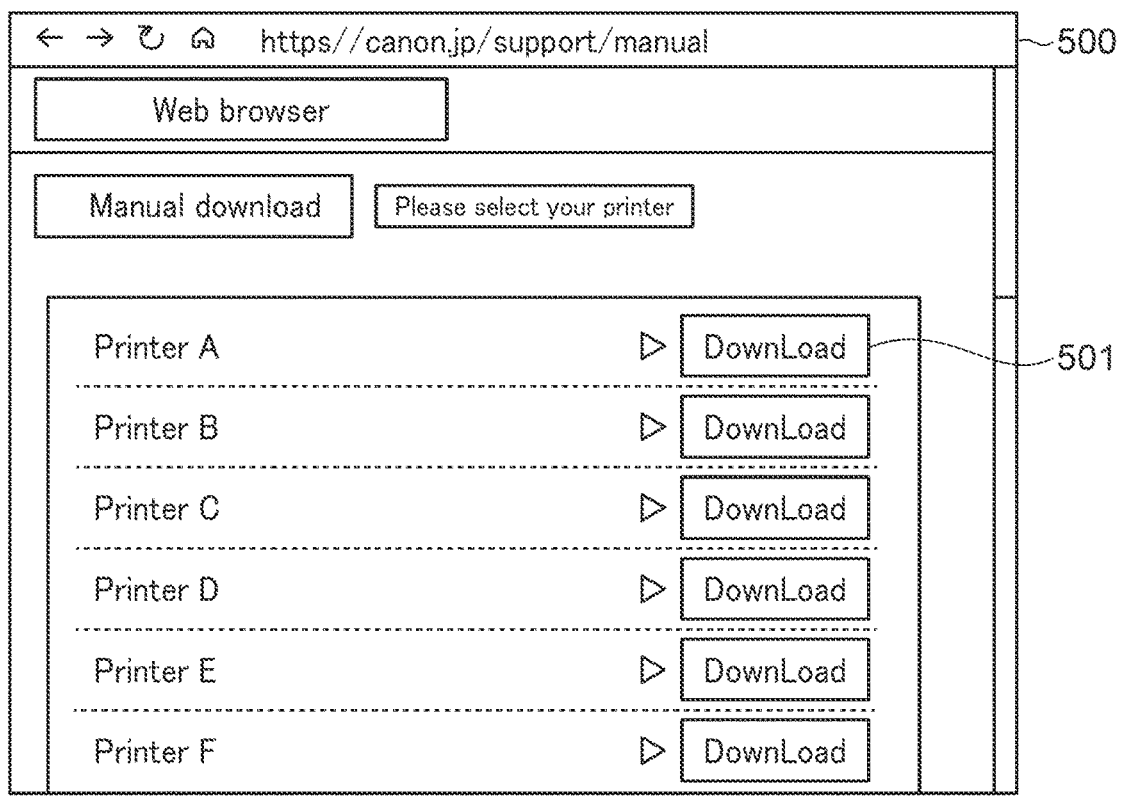
FIGS. 5A and 5B are diagrams each showing an example of a screen displayed on a console section appearing in FIG. 2.

Next, a variety of screens displayed on the console section 207 of the image forming apparatus 101 will be described. FIG. 5A is a diagram showing an example of a cloud collaboration user interface screen 500 displayed on the console section 207 appearing in FIG. 2. The cloud collaboration user interface screen 500 is a screen for prompting a user to select an electronic data item to be printed in a cloud collaboration job. Although the cloud collaboration user interface screen 500 can be built-in software that operates as a dedicated client for connecting to the cloud service 102, the same function as the cloud collaboration user interface screen 500 can be realized as a Web browser function by HTTP connection to a predetermined cloud service URL.

On the cloud collaboration user interface screen 500, a list of electronic data items managed by the cloud service 102 is displayed. FIG. 5A shows a list of manuals of a plurality of image forming apparatuses by way of example. For example, when a user selects a "Download" button 501, the image forming apparatus 101 requests an electronic data item indicated by link information associated with the selected button to the cloud service 102. This starts downloading of the electronic data item.

Figure 5B:
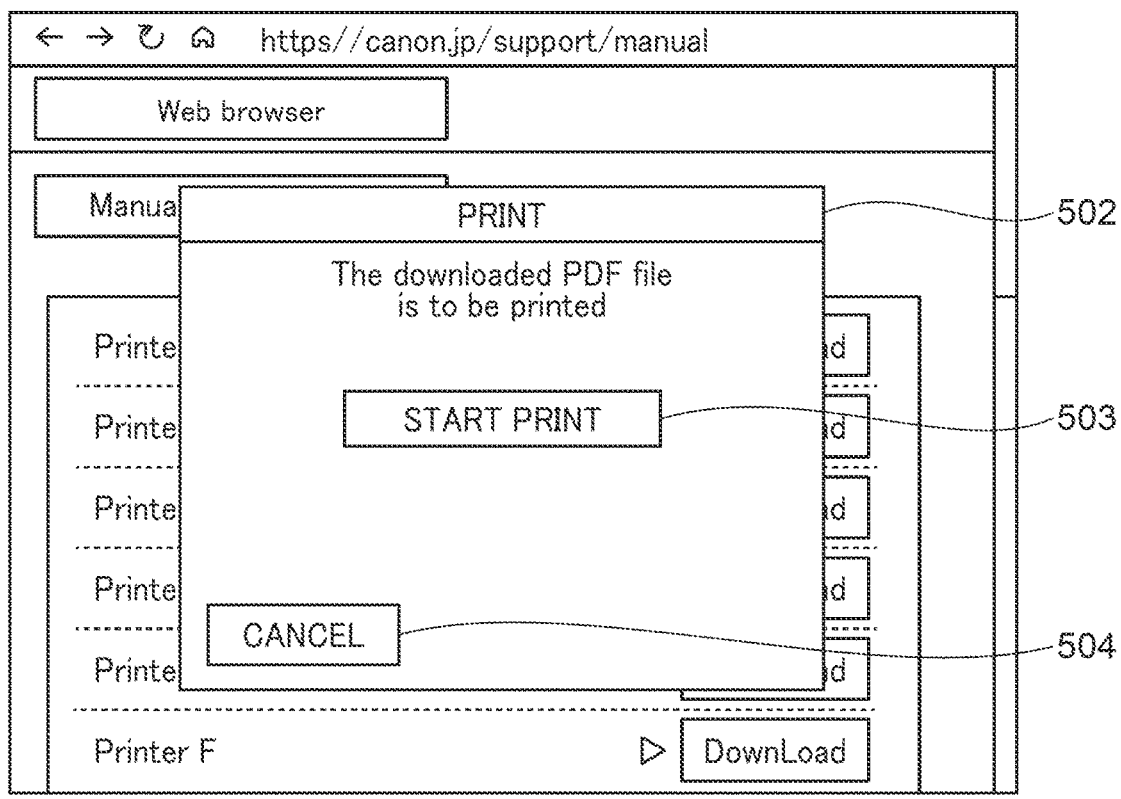

When downloading of the electronic data item is completed, a print user interface screen 502 appearing in FIG. 5B is displayed on the console section 207. The print user interface screen 502 is a screen for prompting a user to give an instruction for causing the image forming apparatus 101 to execute the image forming process of the downloaded electronic data item. On the print user interface screen 502, a "start print" button 503 and a "cancel" button 504 are displayed. When the user selects the "start print" button 503, the image forming apparatus 101 starts the image forming process of the downloaded electronic data item. On the other hand, when the user selects the "cancel" button 504, the image forming apparatus 101 deletes the downloaded electronic data item and does not start the image forming process.

Incidentally, the cloud service 102 has become widespread all over the world and is used in a variety of environments, and hence a variety of sheet sizes are set in respective electronic data items managed by the cloud service 102. As the sheet size, for example, sizes in millimeters, such as A4 and B4, and sizes in inches, such as LTR and LGR, are set. The sizes in millimeters, such as A4 and B4, are mostly used, for example, in Japan, and the sizes in inches, such as LTR and LGR, are mostly used, for example, in North America. Therefore, for example, in the sheet feeding section 213 of the image forming apparatus 101 used in Japan, sheets having sizes in millimeters, such as A4 and B4 which are frequently used, are accommodated. Let it be assumed that the image forming apparatus 101 as described above has accessed the cloud service 102 and acquired an electronic data item which has been generated, for example, in North America and in which the sheet size of LTR is set. The image forming apparatus 101 starts the image forming process of the acquired electronic data item, but no LTR-size sheets are accommodated in the sheet feeding section 213 of the image forming apparatus 101, and hence a sheet feeding error screen 600 shown in FIG. 6A is displayed on the console section 207.

Figure 6A:
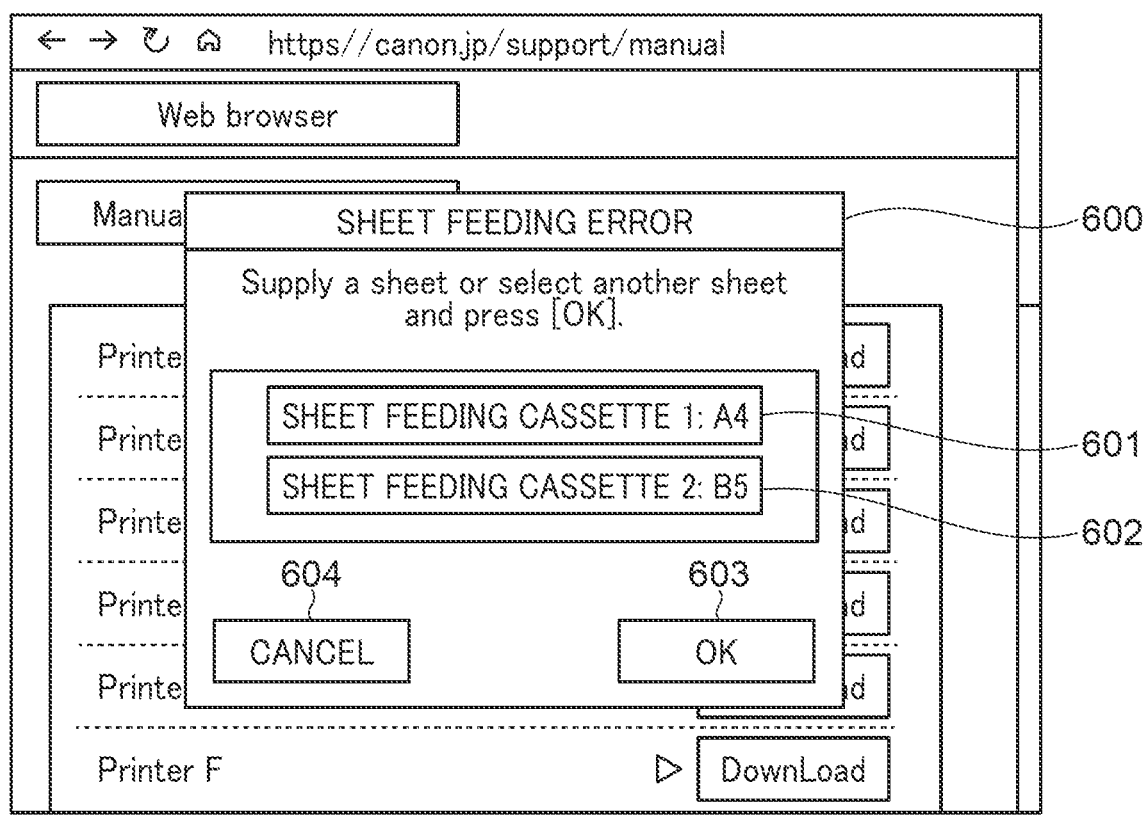
FIGS. 6A and 6B are diagrams each showing an example of a screen displayed on the console section appearing in FIG. 2.

In FIG. 6A, a "sheet feeding cassette 1" button 601 associated with a "sheet feeding cassette 1" accommodating A4-size sheets and a "sheet feeding cassette 2" button 602 associated with a "sheet feeding cassette 2" accommodating B4-size sheets are displayed. Note that in the image forming apparatus 101, for each sheet feeding cassette, the sheet size of sheets accommodated therein is set. When one of the "sheet feeding cassette 1" button 601 and the "sheet feeding cassette 2" button 602 is selected, and then an "OK" button 603 is selected, the image forming apparatus 101 executes the image forming process. In this image forming process, the layout control of a drawing object included in the electronic data item is performed based on the sheet size set for the sheet feeding cassette associated with the button selected by the user.

Here, a case will be described, by way of example, where the user selects the "sheet feeding cassette 2" button 602 and further selects the "OK" button 603, and the image forming apparatus 101 executes the image forming process of the electronic data item in which the sheet size of LTR is designated. In this case, assuming that the sheet size of the sheets accommodated in the "sheet feeding cassette 2" is LTR, the image forming apparatus 101 outputs a print having an image appropriate to this sheet formed thereon, for example, a print 701, shown in FIG. 7A, formed by printing all of the drawing object included in the electronic data item within the sheet. However, in actuality, not the sheets having the sheet size of LTR, but the sheets of B4 are accommodated in the "sheet feeding cassette 2". Therefore, a print in which only a lower left area of the drawing object "F" is formed, as illustrated in a print 702 shown in FIG. 7B, is output. To prevent such a print from being output, the user is required to set a proper scaling factor at which the drawing object included in the electronic data item is all formed within a sheet, by using a "set magnification" button 606 on a setting change screen 605 shown in FIG. 6B.

Figure 6B:
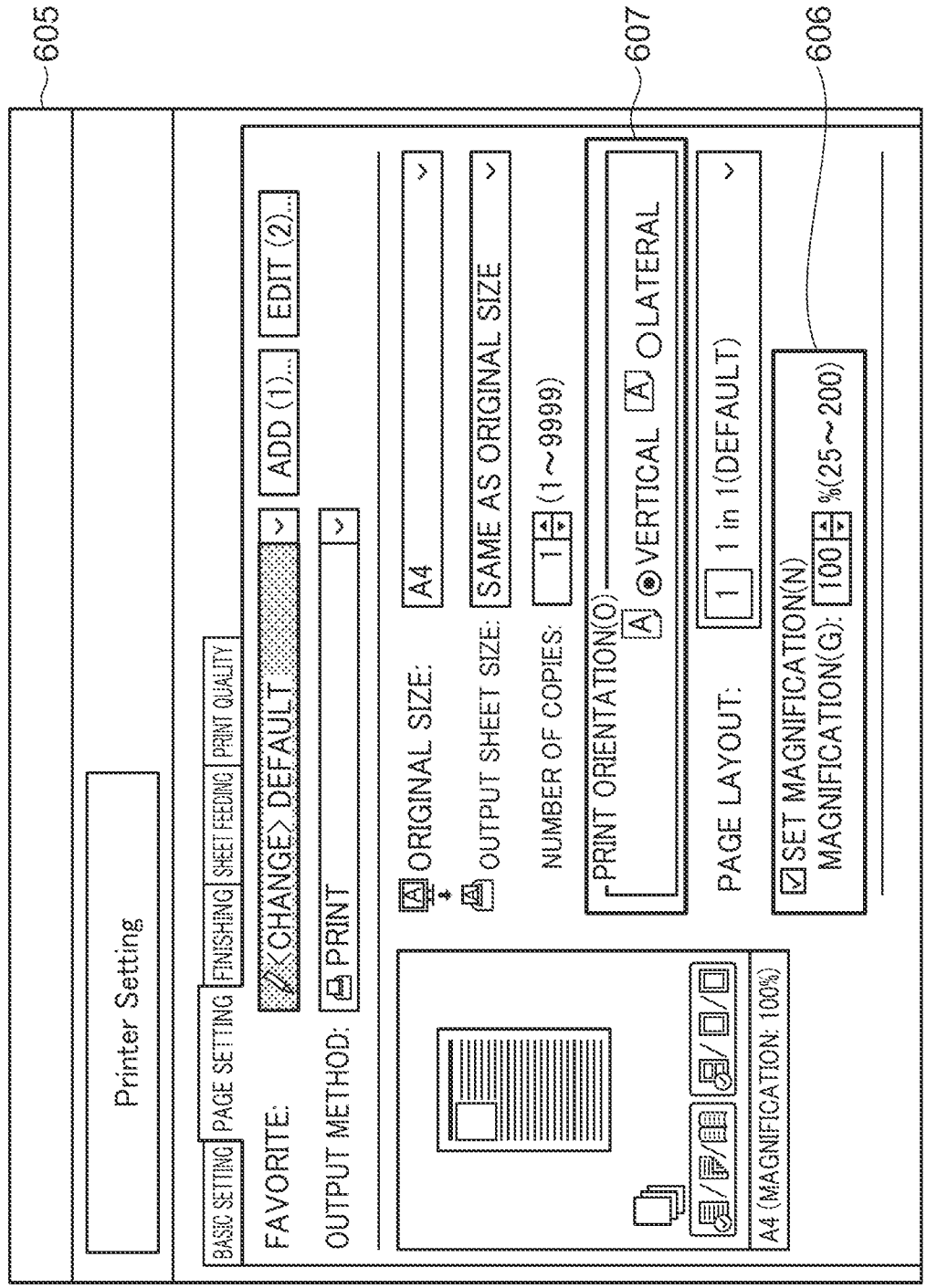
Figure 7A:
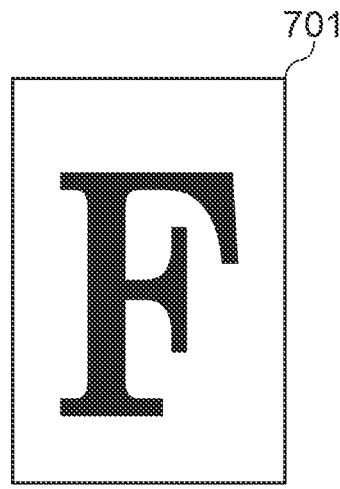
FIGS. 7A to 7D are diagrams each showing an example of a print.
Figure 7B:
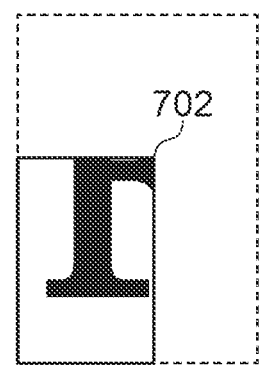
Figure 7C:
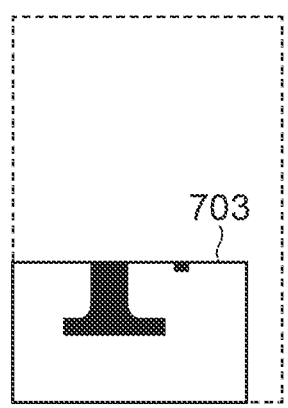

Further, in a case where the orientation of sheets accommodated in the sheet feeding section 213 does not match the orientation of the drawing object, a print having only part of the drawing object formed thereon, as illustrated in a print 703 shown in FIG. 7C, is output, and to prevent such a print from being output, the user is required to make a proper setting of a rotated layout for adjusting the orientation of the drawing object by using "printing orientation" setting 607 on the setting change screen 605 shown in FIG. 6B. However, since the electronic data item is not generated by the user himself/herself, it is very difficult for the user to properly make settings of the scaling factor and the rotated layout while picturing the drawing contents in mind. Further, an image forming apparatus with low performance specifications, which is not equipped with a function of rotating a bitmap image after rendering, cannot change the scaled layout. Further, there is an image forming apparatus that inhibits changing of the layout to a different sheet size, per se, so as to avoid attachment of toner to an area beyond the sheet size. In such a configuration incapable of changing the layout as described above, a user who cannot set LTR sheets for use cannot start printing of the electronic data item. That is, in a case where no sheets matching a sheet size included in the electronic data item acquired from the cloud service 102 are accommodated in the sheet feeding section 213, it is impossible to print an image appropriate to a sheet fed from the sheet feeding section 213.

On the other hand, in the present embodiment, in a case where job attribute information indicating a cloud collaboration job is included in an electronic data item, an image of the electronic data item, appropriate to a sheet fed from the sheet feeding section 213, is formed on this sheet.

FIG. 8 is a flowchart of a cloud collaboration control process performed by the image forming apparatus 101 appearing in FIG. 1. The cloud collaboration control process is realized by the central processing unit 201 that loads a program stored in the auxiliary storage device 203 into the main storage device 202 and executes the loaded program. The cloud collaboration control process is executed when the console section 207 of the image forming apparatus 101 receives an instruction for using the cloud collaboration function from a user.

Referring to FIG. 8, first, the central processing unit 201 causes the cloud collaboration user interface screen 500 to be displayed on the console section 207 (step S801). Then, the central processing unit 201 waits until the user selects one of the "Download" buttons displayed on the cloud collaboration user interface screen 500. When the user selects one of the "Download" buttons displayed on the cloud collaboration user interface screen 500, the central processing unit 201 determines whether or not link information associated with the selected "Download" button has been acquired (step S802).

If it is determined in the step S802 that no link information associated with the selected "Download" button has been acquired, the process returns to the step S801. If it is determined in the step S802 that the link information associated with the selected "Download" button has been acquired, the process proceeds to a step S803.

In the step S803, the central processing unit 201 analyzes the acquired link information. With this, electronic information indicating an electronic data item which is managed by the cloud service 102 and designated by the user as an object to be printed, for example, URL information is extracted. Then, the central processing unit 201 transmits a request for the electronic data item indicated by the link information to the cloud service 102. In response to this request, the cloud service 102 transmits the electronic data item indicated by the link information to the image forming apparatus 101.

Then, the central processing unit 201 controls the network interface 205 to receive the electronic data item indicated by the link information (step S804). Then, the central processing unit 201 executes a rendering process in FIG. 9 (step S805). Then, the central processing unit 201 starts printing using a bitmap image generated by the rendering process (step S806), followed by terminating the present process.

Figure 9:
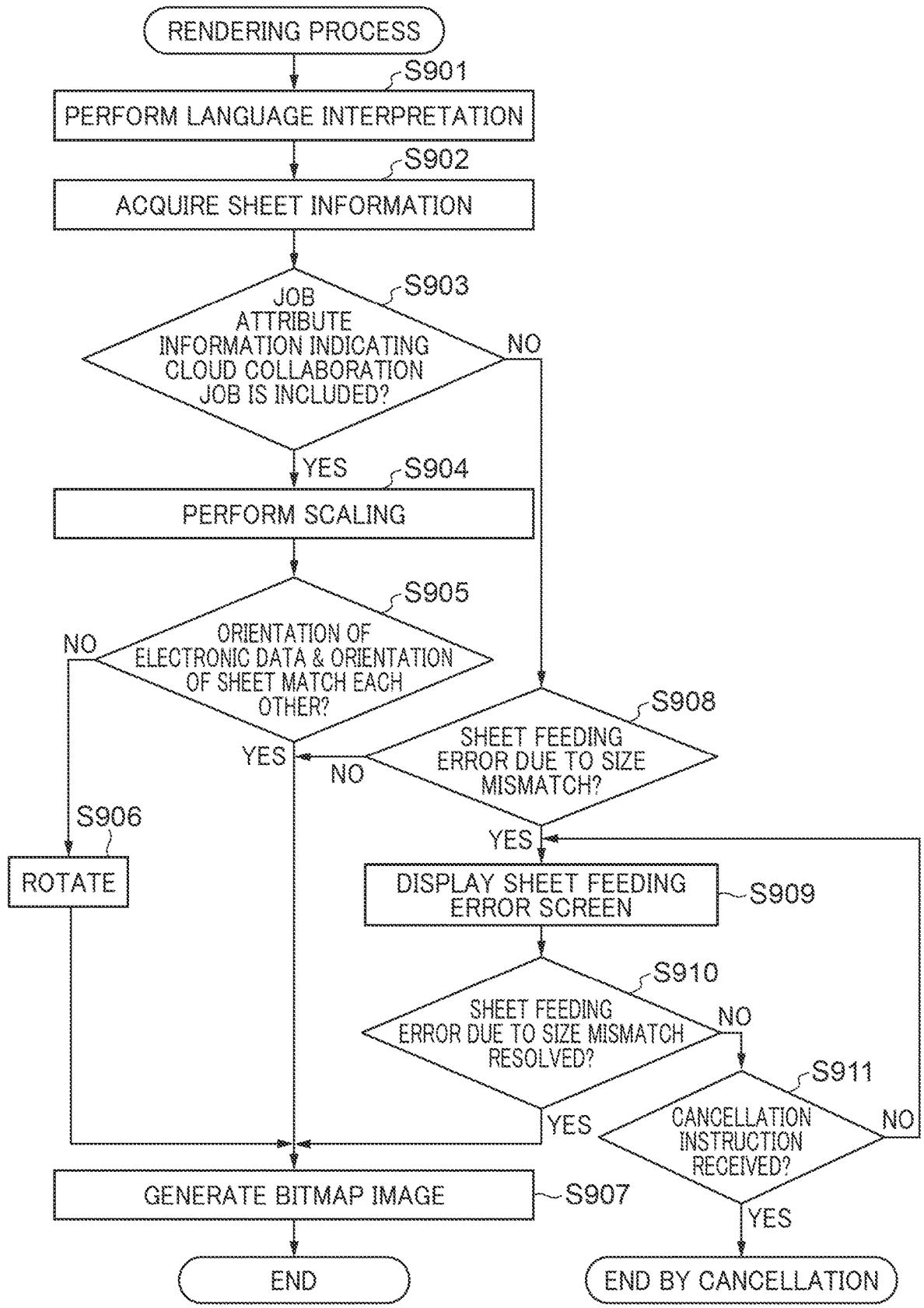
FIG. 9 is a flowchart of a rendering process in a step in FIG. 8.

FIG. 9 is a flowchart of the rendering process in the step S805 in FIG. 8.

Referring to FIG. 9, the central processing unit 201 performs language interpretation of the contents of the electronic data item (step S901). With this, the drawing information, the attribute information, the sheet size, and so forth included in the electronic data item are extracted. Then, the central processing unit 201 acquires sheet information set for the sheet feeding section 213 of the image forming apparatus 101 (step S902). This sheet information includes respective sheet sizes set for the sheet feeding cassettes forming the sheet feeding section 213 of the image forming apparatus 101. Then, the central processing unit 201 determines whether or not job attribute information indicating a cloud collaboration job is included in the electronic data item (step S903).

If it is determined in the step S903 that the job attribute information indicating a cloud collaboration job is included in the electronic data item, the process proceeds to a step S904. In the step S904, the central processing unit 201 executes scaling for making the image of the electronic data item appropriate to a sheet fed from the sheet feeding section 213. In the scaling, the layout control is performed at a scaling factor at which the drawing object forming the electronic data item is printed within a sheet fed from the sheet feeding section 213. As this scaling factor, a value is set which makes the sheet size extracted from the electronic data item and the sheet size of the sheet fed from the sheet feeding section 213 equal in aspect ratio. Note that in a case where the sheet size extracted from the electronic data item and the sheet size of the sheet fed from the sheet feeding section 213 match each other, the scaling factor is set as one, and the drawing object is neither enlarged nor reduced.

Then, the central processing unit 201 determines whether or not the orientation of the electronic data item and the orientation of the sheet match each other (step S905). In the step S905, the determination is performed, for example, by determining whether or not a magnitude relation between the width and the height of the sheet size extracted from the electronic data item matches a magnitude relation between the respective lengths of a long side and a short side of the sheet fed from the sheet feeding section 213. Alternatively, the determination is performed by extracting a rotational angle of the image from /Rotate entry of a PDF command to determine the orientation of the image, and determining whether or not the image and the sheet fed from the sheet feeding section 213 match each other in the orientation and the magnitude relation between the lengths of the width and the height.

Figure 7D:
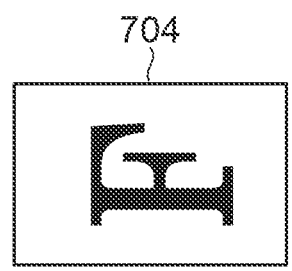

If it is determined in the step S905 that the orientation of the electronic data item and the orientation of the sheet match each other, the process proceeds to a step S907, described hereinafter. If it is determined in the step S905 that the orientation of the electronic data item and the orientation of the sheet do not match each other, the process proceeds to a step S906. In the step S906, the central processing unit 201 executes rotation processing for making the image of the electronic data item appropriate to the sheet fed from the sheet feeding section 213. In the rotation processing, the layout control is performed with a rotated layout setting that causes the orientation of the drawing object of the electronic data item to match the orientation of the sheet fed from the sheet feeding section 213. Thus, in the present embodiment, in a case where the job attribute information indicating a cloud collaboration job is included in the electronic data item, the layout control to make the image of the electronic data item appropriate not to a sheet of a sheet size extracted from the electronic data item, but to a sheet fed from the sheet feeding section 213 is performed. With this, even when sheets of a sheet size different from the sheet size included in the electronic data item are accommodated in the sheet feeding section 213, a print 704 shown in FIG. 7D, appropriate to this sheet, is output.

Then, the central processing unit 201 generates a bitmap image by performing the rendering process on the drawing object included in the electronic data item (step S907). After that, the rendering process is terminated, and the process proceeds to the step S806.

If it is determined in the step S903 that the job attribute information indicating a cloud collaboration job is not included in the electronic data item, the process proceeds to a step S908. In the step S908, the central processing unit 201 determines whether or not a sheet feeding error due to a size mismatch has occurred. In the step S908, for example, in a case where the sheet size extracted from the electronic data item matches none of the sheet sizes set for the sheet feeding cassettes of the sheet feeding section 213, it is determined that a sheet feeding error due to a size mismatch has occurred. On the other hand, in a case where the sheet size extracted from the electronic data item matches one of the sheet sizes set for the sheet feeding cassettes of the sheet feeding section 213, it is determined that a sheet feeding error due to a size mismatch has not occurred.

If it is determined in the step S908 that a sheet feeding error due to a size mismatch has not occurred, the process proceeds to the step S907. In this case, the image of the electronic data item is formed on a sheet having the sheet size extracted from the electronic data item. This makes it possible, in the cloud collaboration job, to print an image appropriate to a sheet fed from the sheet feeding section 213 without allowing print jobs other than the cloud collaboration job to be affected thereby.

If it is determined in the step S908 that a sheet feeding error due to a size mismatch has occurred, the process proceeds to a step S909. In the step S909, the central processing unit 201 causes the sheet feeding error screen 600 to be displayed on the console section 207. Thus, the image forming apparatus 101 prompts the user to set sheets having the sheet size extracted from the electronic data item, in the sheet feeding section 213.

Then, the central processing unit 201 acquires the sheet size set for the sheet feeding cassette designated by the user on the sheet feeding error screen 600. The central processing unit 201 determines whether or not the sheet feeding error due to a size mismatch has been resolved based on the sheet size set for the sheet feeding cassette (step S910). In the step S910, for example, in a case where the sheet size set for the sheet feeding cassette matches the sheet size extracted from the electronic data item, it is determined that the sheet feeding error due to a size mismatch has been resolved. On the other hand, in a case where the sheet size set for the sheet feeding cassette does not match the sheet size extracted from the electronic data item, it is determined that the sheet feeding error due to a size mismatch has not been resolved.

If it is determined in the step S910 that the sheet feeding error due to a size mismatch has been resolved, the process proceeds to the step S907. If it is determined in the step S910 that the sheet feeding error due to a size mismatch has not been resolved, the central processing unit 201 determines whether or not a cancellation instruction has been received from the user (step S911). In the present embodiment, the user can give a cancellation instruction by selecting a "cancel" button 604 on the sheet feeding error screen 600.

If it is determined in the step S911 that the cancellation instruction has been received from the user, the central processing unit 201 cancels the cloud collaboration job for performing the image forming process of the electronic data item received in the step S804 and terminates the cloud collaboration control process. If it is determined in the step S911 that the cancellation instruction has not been received from the user, the process returns to the step S909.

According to the above-described embodiment, in a case where job attribute information indicating a cloud collaboration job is included in an electronic data item, an image of the electronic data item, which is or is made appropriate to a sheet fed from the sheet feeding section 213, is formed on this sheet. With this, in a case where no sheets matching a sheet size included in the electronic data item received from the cloud service 102 are accommodated in the sheet feeding section 213, it is possible to generate an image appropriate to a sheet fed from the sheet feeding section 213 by performing image processing and print the generated image on the fed sheet.

Further, in the above-described embodiment, the image forming apparatus 101 acquires an electronic data item from the cloud service 102, which is selected by a user from the list of electronic data items displayed on the console section 207. With this, in a cloud collaboration job in which the electronic data item to be printed is selected on the console section 207, in a case where no sheets matching a sheet size included in the electronic data item are accommodated in the sheet feeding section 213, it is possible to generate and print an image appropriate to a sheet fed from the sheet feeding section 213 by performing image processing.

Further, in the above-described embodiment, when the image forming apparatus 101 acquires an electronic data item from the cloud service 102, the image forming apparatus 101 sets job attribute information indicating a cloud collaboration job, in the acquired electronic data item. With this, in the configuration in which the image forming apparatus 101 sets attribute information in an electronic data item, in a case where no sheets matching a sheet size included in the acquired electronic data item are accommodated in the sheet feeding section 213, it is possible to generate and print an image appropriate to a sheet fed from the sheet feeding section 213 by performing image processing.

In the above-described embodiment, the image forming apparatus 101 acquires an electronic data item for which job attribute information indicating a cloud collaboration job has been set from the cloud service 102. With this, in the configuration in which the cloud service 102 provides an electronic data item in which attribute information has been set, in a case where no sheets matching a sheet size included in the acquired electronic data item are accommodated in the sheet feeding section 213, it is possible to generate and print an image appropriate to a sheet fed from the sheet feeding section 213 by performing image processing.

In the above-described embodiment, an image of the electronic data item is made appropriate to a sheet fed from the sheet feeding section 213 by adjusting the scaling factor of an electronic data item. This makes it possible, in a case where no sheets matching a sheet size included in the acquired electronic data item are accommodated in the sheet feeding section 213, to make the size of the image of the electronic data item appropriate to a sheet fed from the sheet feeding section 213.

Further, in the above-described embodiment, the image of the electronic data item is made appropriate to a sheet fed from the sheet feeding section 213, by adjusting the orientation of an image of an electronic data item. This makes it possible, in a case where no sheets matching a sheet size included in the acquired electronic data item are accommodated in the sheet feeding section 213, to make the orientation of the image of the electronic data item appropriate to a sheet fed from the sheet feeding section 213.

Next, a second embodiment of the present invention will be described.

In recent years, a use case has also increased, where an image forming apparatus acquires link information for accessing an electronic data item by reading code information, such as a QR code and a barcode, and an IC card, by using a code reading device. In the second embodiment, a description will be given assuming a case where an electronic data item managed by the cloud service 102 is printed using link information obtained by reading code information or an IC card as described above. Further, the second embodiment can also be applied to a use case of printing an electronic data item used on a cloud service of a virtual Web conference system, which has become widespread in recent office environments, and hence the description will be given of the configuration also assuming this use case.

Figure 10:
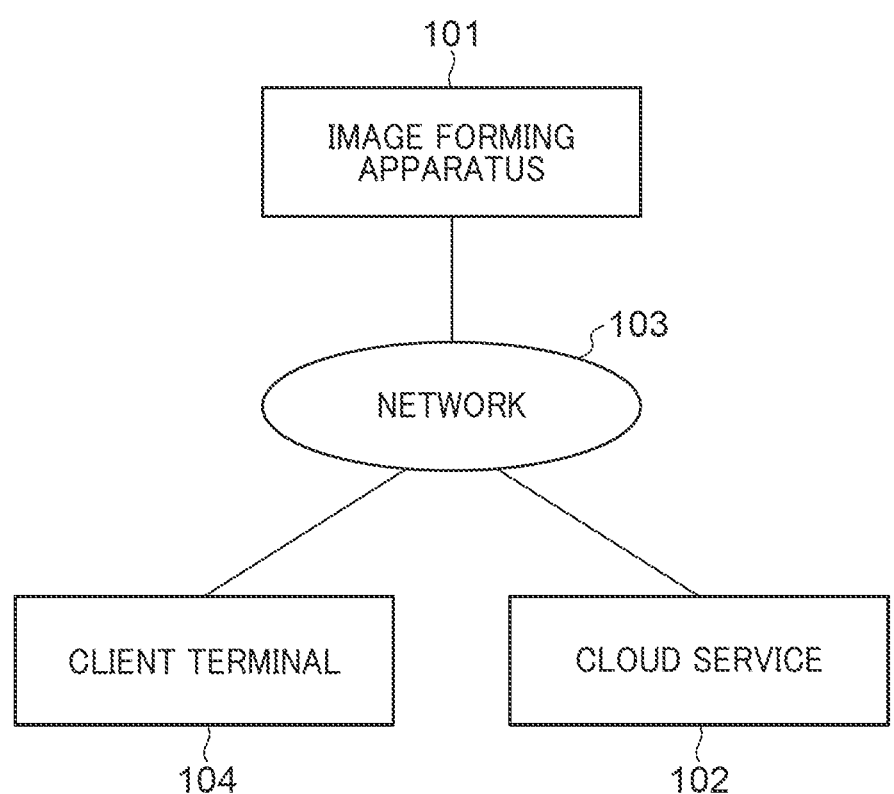
FIG. 10 is a block diagram showing the configuration of a printing system including an image forming apparatus according to a second embodiment of the present invention.

FIG. 10 is a block diagram showing the configuration of a printing system of the second embodiment. Referring to FIG. 10, this printing system includes not only the above-described image forming apparatus 101 and cloud service 102, but also a client terminal 104. The image forming apparatus 101, the cloud service 102, and the client terminal 104 are connected via the network 103.

The client terminal 104 is a mobile terminal, such as a PC, a mobile phone, a personal digital assistant (PDA), a multi-function mobile phone (smartphone), and a tablet, which can display code information, such as a QR code, on a display section thereof. Note that the client terminal 104 can be a terminal, such as a head-mount display, which can be connected to a Web conference system and acquire an electronic data item from the cloud service 102 by using short-range wireless communication. Note that in the present embodiment, a description will be given of a configuration in which the image forming apparatus 101 acquires link information of an electronic data item by reading a QR code displayed on the client terminal 104 using the code reading device 211 by way of example, but this is not limitative. For example, the image forming apparatus 101 can acquire link information of an electronic data item by reading a card on which a QR code is printed, using the code reading device 211. Alternatively, the image forming apparatus 101 can acquire link information of an electronic data item by reading an IC card using the code reading device 211. Note that also in the second embodiment, the cloud service 102 can write attribute information in the header portion 401 when the electronic data item is transmitted to the image forming apparatus 101. Alternatively, the image forming apparatus 101 can write attribute information based on the print settings information set for the image forming apparatus 101, when an electronic data item is received from the cloud service 102. Note that in the configuration in which the image forming apparatus 101 writes attribute information in the header portion 401, in a case where the image forming apparatus 101 acquires link information by using one of a QR code, an IC card, and short-range wireless communication, the image forming apparatus 101 writes job attribute information indicating a cloud collaboration job in the header portion 401.

Figure 11A:
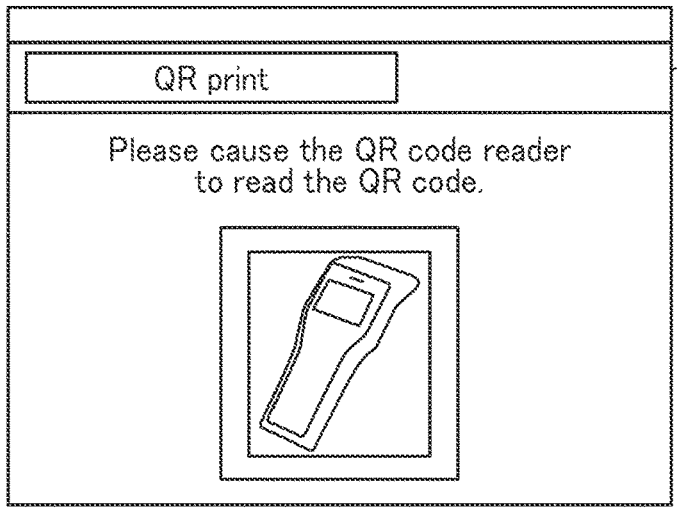
FIGS. 11A to 11C are diagrams each showing an example of a user interface screen displayed on the console section of the image forming apparatus according to the second embodiment.
Figure 11B:
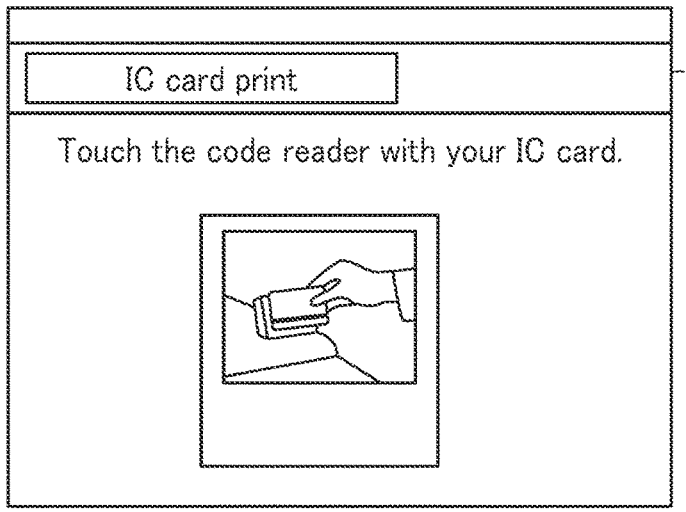
Figure 11C:
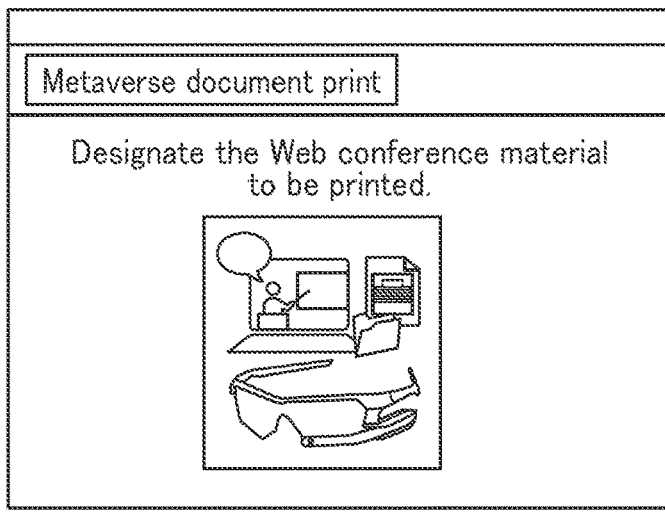

Next, a variety of user interface screens displayed on the console section 207 of the image forming apparatus 101 according to the second embodiment will be described. FIGS. 11A to 11C are diagrams each showing an example of the user interface screen displayed on the console section 207 of the image forming apparatus 101 according to the second embodiment. Upon receipt of a request for displaying a user interface screen for using the cloud collaboration function, the image forming apparatus 101 shifts to a state capable of receiving link information and causes a user interface screen associated with the display request to be displayed on the console section 207.

FIG. 11A shows a user interface screen 1101 displayed in a case where link information is read from a QR code. On the user interface screen 1101, an instruction for prompting the user to cause the code reading device 211 to read a QR code is displayed. The user cause a QR code including link information of an electronic data item to be printed to be displayed on a display section of the client terminal 104 held by the user according to the instruction. The image forming apparatus 101 acquires the link information of the electronic data item to be printed, by causing the code reading device 211 to read the QR code. Note that in the image forming apparatus 101 displaying the user interface screen 1101 on the console section 207, the code reading device 211 can read not only a QR code displayed on the display section of the client terminal 104, but also a QR code printed on a card.

FIG. 11B shows a user interface screen 1102 displayed in a case where link information is read from an IC card. On the user interface screen 1102, an instruction for touching the code reading device 211 with an IC card is displayed. According to this instruction, the user causes the IC card, which holds link information of an electronic data item to be printed, to touch the code reading device 211. The image forming apparatus 101 acquires the link information of the electronic data item to be printed, by reading the IC card using the code reading device 211.

FIG. 11C shows a user interface screen 1103 displayed in a case where link information is acquired from a head-mount display. On the user interface screen 1103, an instruction for prompting the user to designate an electronic data item to be printed is displayed. According to the instruction, the user designates an electronic data item to be printed from the list of electronic data items displayed on the head-mount display which accesses a virtual space constructed by a Web conference system. The head-mount display transmits link information of the designated electronic data item to the image forming apparatus 101. Note that the head-mount display can transmit the link information to the image forming apparatus 101, by using short-range wireless communication, such as NFC or Bluetooth, or indirectly transmit the link information to the image forming apparatus 101 via the network 103.

Figure 12:
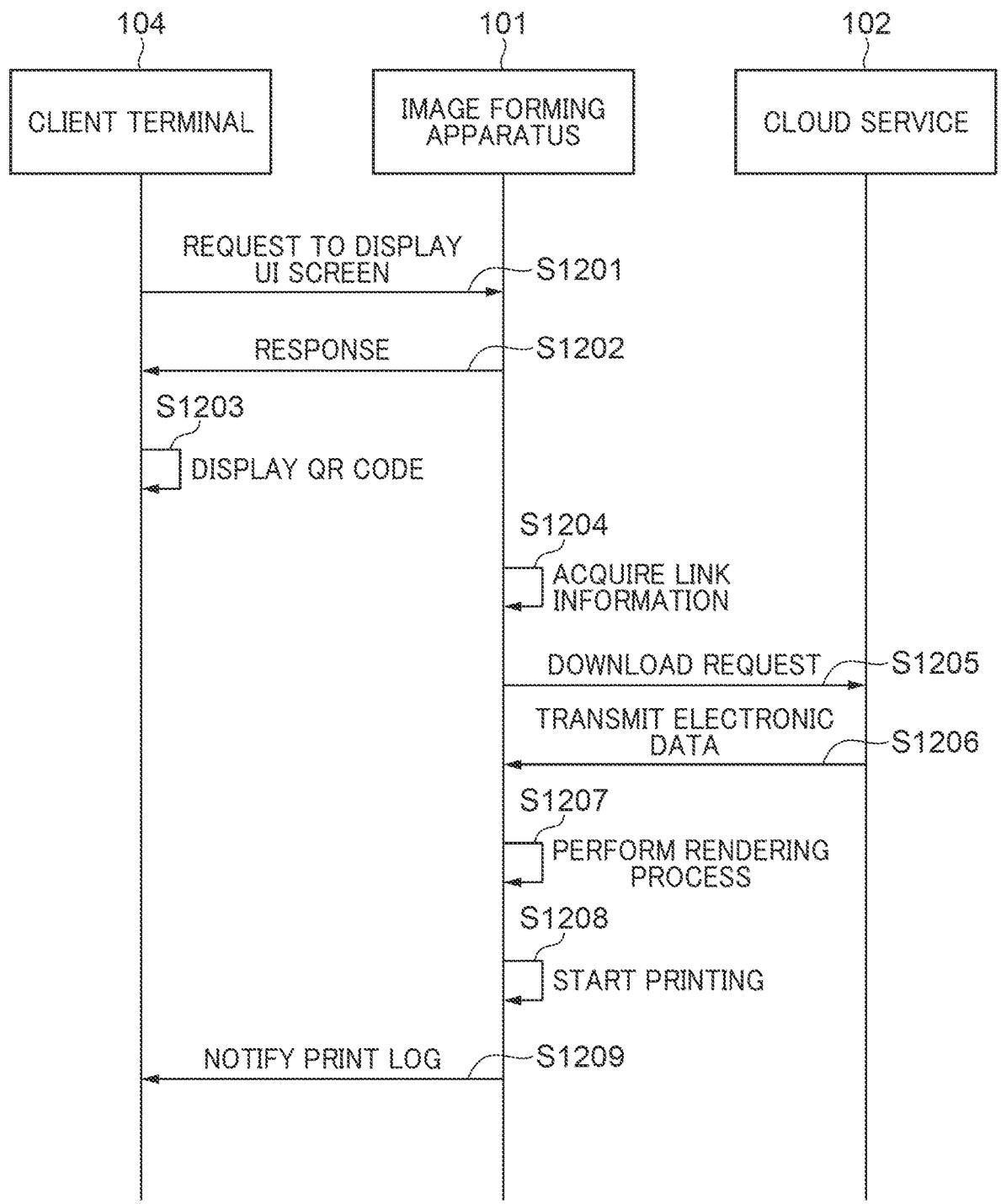
FIG. 12 is a sequence diagram of a cloud collaboration process performed in the printing system including the image forming apparatus according to the second embodiment.

Next, a process using the cloud collaboration function (hereinafter referred to as the "cloud collaboration process") in the second embodiment will be described. FIG. 12 is a sequence diagram of the cloud collaboration process performed in the printing system of the second embodiment. The cloud collaboration process is performed by the client terminal 104, the image forming apparatus 101, and the cloud service 102.

Referring to FIG. 12, first, the client terminal 104 requests the image forming apparatus 101 to display the user interface screen for using the cloud collaboration function according to an instruction received from the user (step S1201). The instruction received from the user is, for example, an instruction for displaying one of the above-described user interface screens 1101, 1102, and 1103. Here, let it be assumed that the user has given an instruction for displaying the user interface screen 1101 by way of example. In the step S1201, for example, the client terminal 104 transmits the above-mentioned display request to the image forming apparatus 101 by contact or non-contact short-range wireless communication.

In response to the display request, the image forming apparatus 101 shifts to a state capable of receiving link information and displays the user interface screen 1101 on the console section 207. Note that although in the present embodiment, the description is given of the configuration in which the user interface screen is displayed on the console section 207 of the image forming apparatus 101 according to the instruction input by the user to an operation section of the client terminal 104, this is not limitative. For example, the user interface screen can be displayed on the console section 207 of the image forming apparatus 101 in accordance with starting of the cloud collaboration function by the user operating the console section 207 of the image forming apparatus 101. Then, the image forming apparatus 101 transmits a response to the above-mentioned display request (step S1202). According to the instruction displayed on the user interface screen 1101, the user instructs the client terminal 104 to display a QR code including link information indicating an electronic data item to be printed.

In response to the display instruction, the client terminal 104 causes the above-mentioned QR code to be displayed on the display section thereof (step S1203). The user holds the display section of the client terminal 104, which is displaying the QR code, over the code reading device 211 of the image forming apparatus 101.

Then, the image forming apparatus 101 acquires the link information by reading the QR code using the code reading device 211 (step S1204). Then, the image forming apparatus 101 transmits a request for downloading the electronic data item indicated by the acquired link information to the cloud service 102 (step S1205).

The cloud service 102 identifies the electronic data item designated by the download request from a plurality of electronic data items to be managed. Then, the cloud service 102 transmits the identified electronic data item to the image forming apparatus 101 (step S1206).

Then, the image forming apparatus 101 performs the above-described rendering process in the step S805 based on the received electronic data item (step S1207). Then, the image forming apparatus 101 executes the processing described in the step S806 (step S1208). Then, the image forming apparatus 101 transmits a print log to the client terminal 104 (step S1209). The print log is, for example, information indicating that printing of the electronic data item is completed or information indicating that printing of the electronic data item has failed. After that, the present process is terminated.

Thus, in the above-described configuration of the second embodiment, the image forming apparatus 101 acquires an electronic data item indicated by link information obtained by reading code information, from the cloud service 102. This makes it possible, in a cloud collaboration job for printing an electronic data item indicated by link information acquired from code information, to generate and print an image appropriate to a sheet fed from the sheet feeding section 213 by performing image processing in a case where no sheets matching a sheet size included in the electronic data item are accommodated in the sheet feeding section 213.

Further, in the above-described configuration of the second embodiment, the image forming apparatus 101 acquires an electronic data item indicated by link information obtained by reading an IC card from the cloud service 102. This makes it possible, in a cloud collaboration job for printing an electronic data item indicated by link information acquired from an IC card, to generate and print an image appropriate to a sheet fed from the sheet feeding section 213 by performing image processing in a case where no sheets matching a sheet size included in the electronic data item are accommodated in the sheet feeding section 213.

Further, in the above-described configuration of the second embodiment, the image forming apparatus 101 acquires an electronic data item indicated by link information received from an external apparatus by using short-range wireless communication, from the cloud service 102. This makes it possible, in a cloud collaboration job for printing an electronic data item indicated by link information acquired by short-range wireless communication, to generate and print an image appropriate to a sheet fed from the sheet feeding section 213 by performing image processing in a case where no sheets matching a sheet size included in the electronic data item are accommodated in the sheet feeding section 213.

Other Embodiments

Embodiment(s) of the present invention can also be realized by a computer of a system or apparatus that reads out and executes computer executable instructions (e.g., one or more programs) recorded on a storage medium (which can also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-173238 filed Oct. 28, 2022, which is hereby incorporated by reference herein in its entirety.

What is claimed is:

1. An image forming apparatus that includes a sheet feeding unit and forms an image on a sheet fed from the sheet feeding unit, comprising:
an acquisition unit configured to acquire an electronic data item from a server that manages a plurality of electronic data items;
an extraction unit configured to extract a sheet size from the electronic data item; and
an image forming unit configured to form an image of the electronic data item on a sheet having the extracted sheet size, wherein in a case where predetermined attribute information indicating that the electronic data item is for a job using the server is included in the electronic data item, the image forming unit forms the image of the electronic data item, which is appropriate to a sheet fed from the sheet feeding unit, on the fed sheet.

2. The image forming apparatus according to claim 1, further comprising a display unit configured to display a list of electronic data items managed by the server,
wherein the acquisition unit acquires an electronic data item selected by a user from the list, from the server.

3. The image forming apparatus according to claim 1, further comprising a reading unit configured to read code information,
wherein the acquisition unit acquires an electronic data item indicated by link information obtained by reading the code information, from the server.

4. The image forming apparatus according to claim 1, further comprising a reading unit configured to read an IC card,
wherein the acquisition unit acquires an electronic data item indicated by link information obtained by reading the IC card, from the server.

5. The image forming apparatus according to claim 1, further comprising a communication unit configured to perform short-range wireless communication,
wherein the acquisition unit acquires an electronic data item indicated by link information received from an external apparatus by the short-range wireless communication, from the server.

6. The image forming apparatus according to claim 1, further comprising a setting unit configured to set, when an electronic data item is acquired from the server, the predetermined attribute information in the acquired electronic data item.

7. The image forming apparatus according to claim 1, wherein the acquisition unit acquires an electronic data item in which the predetermined attribute information is set, from the server.

8. The image forming apparatus according to claim 1, wherein the image forming unit adjusts a scaling factor of the image of the electronic data item to thereby make the image of the electronic data item appropriate to a sheet fed from the sheet feeding unit.

9. The image forming apparatus according to claim 1, wherein the image forming unit adjusts an orientation of the image of the electronic data item to thereby make the image of the electronic data item appropriate to a sheet fed from the sheet feeding unit.

10. The image forming apparatus according to claim 1, wherein in a case where the predetermined attribute information is not included in the electronic data item, the image forming unit forms the image of the electronic data item on a sheet having the extracted sheet size.

11. A method of controlling an image forming apparatus that includes a sheet feeding unit and forms an image on a sheet fed from the sheet feeding unit, comprising:
acquiring an electronic data item from a server that manages a plurality of electronic data items;
extracting a sheet size from the electronic data item; and
forming an image of the electronic data item on a sheet having the extracted sheet size,
wherein the forming of the image of the electronic data item includes forming the image of the electronic data item, which is appropriate to a sheet fed from the sheet feeding unit, on the fed sheet in a case where predetermined attribute information indicating that the electronic data item is for a job using the server is included in the electronic data item.

12. A non-transitory computer-readable storage medium storing a program for causing a computer to execute a method of controlling an image forming apparatus that includes a sheet feeding unit and forms an image on a sheet fed from the sheet feeding unit,
wherein the method comprises:
acquiring an electronic data item from a server that manages a plurality of electronic data items;
extracting a sheet size from the electronic data item; and
forming an image of the electronic data item on a sheet having the extracted sheet size,
wherein the forming of the image of the electronic data item includes forming the image of the electronic data item, which is appropriate to a sheet fed from the sheet feeding unit, on the fed sheet in a case where predetermined attribute information indicating that the electronic data item is for a job using the server is included in the electronic data item.

* * * * *